(12) United States Patent
Liu

(10) Patent No.: US 12,039,049 B2
(45) Date of Patent: Jul. 16, 2024

(54) SECURE IDENTITY CHAINING BETWEEN COMPONENTS OF TRUSTED COMPUTING BASE

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 101 days.

(21) Appl. No.: 17/353,497

(22) Filed: Jun. 21, 2021

(65) Prior Publication Data

US 2022/0405391 A1 Dec. 22, 2022

(51) Int. Cl.
*G06F 21/57* (2013.01)
*G06F 12/14* (2006.01)
*G06F 21/73* (2013.01)

(52) U.S. Cl.
CPC ............ *G06F 21/572* (2013.01); *G06F 12/14* (2013.01); *G06F 21/73* (2013.01); *G06F 2221/033* (2013.01)

(58) Field of Classification Search
CPC ...... G06F 21/14; G06F 21/1408; G06F 21/57; G06F 21/572; G06F 21/71; G06F 21/73; G06F 2221/033

See application file for complete search history.

(56) References Cited

U.S. PATENT DOCUMENTS

| 10,796,002 | B1 * | 10/2020 | Raskin | G06F 21/85 |
| 2014/0281354 | A1 * | 9/2014 | Tkacik | G06F 12/1009 |
| | | | | 711/206 |
| 2018/0034682 | A1 * | 2/2018 | Gulati | H04L 9/3268 |
| 2019/0230002 | A1 * | 7/2019 | Bernat | H04L 63/0823 |

OTHER PUBLICATIONS

Dennis Mattoon, "DICE Certificate Profiles", Mar. 20, 2018.
Trusted Computing Group (TCG): "DICE Certificate Profiles", Mar. 10, 2020.

* cited by examiner

*Primary Examiner* — D'Arcy Winston Straub
(74) *Attorney, Agent, or Firm* — Greenberg Traurig

(57) ABSTRACT

Systems, apparatuses, and methods to secure identity chaining between software/firmware components of trusted computing base. A memory device includes a secure memory region having access control based on cryptography. The secure memory region stores component information about a second component configured to be executed after a first component during booting. Prior to using a component identity of the second component to generate a compound identifier of the first component, health of the second component to be executed is verified based on the component information stored in the secure memory region.

20 Claims, 9 Drawing Sheets

ND ENTITY CHAINING BETWEEN
COMPONENTS OF TRUSTED COMPUTING
BASE

TECHNICAL FIELD

At least some embodiments disclosed herein relate to computer security in general and more particularly, but not limited to, secure loading software components from memory devices during booting of computing devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
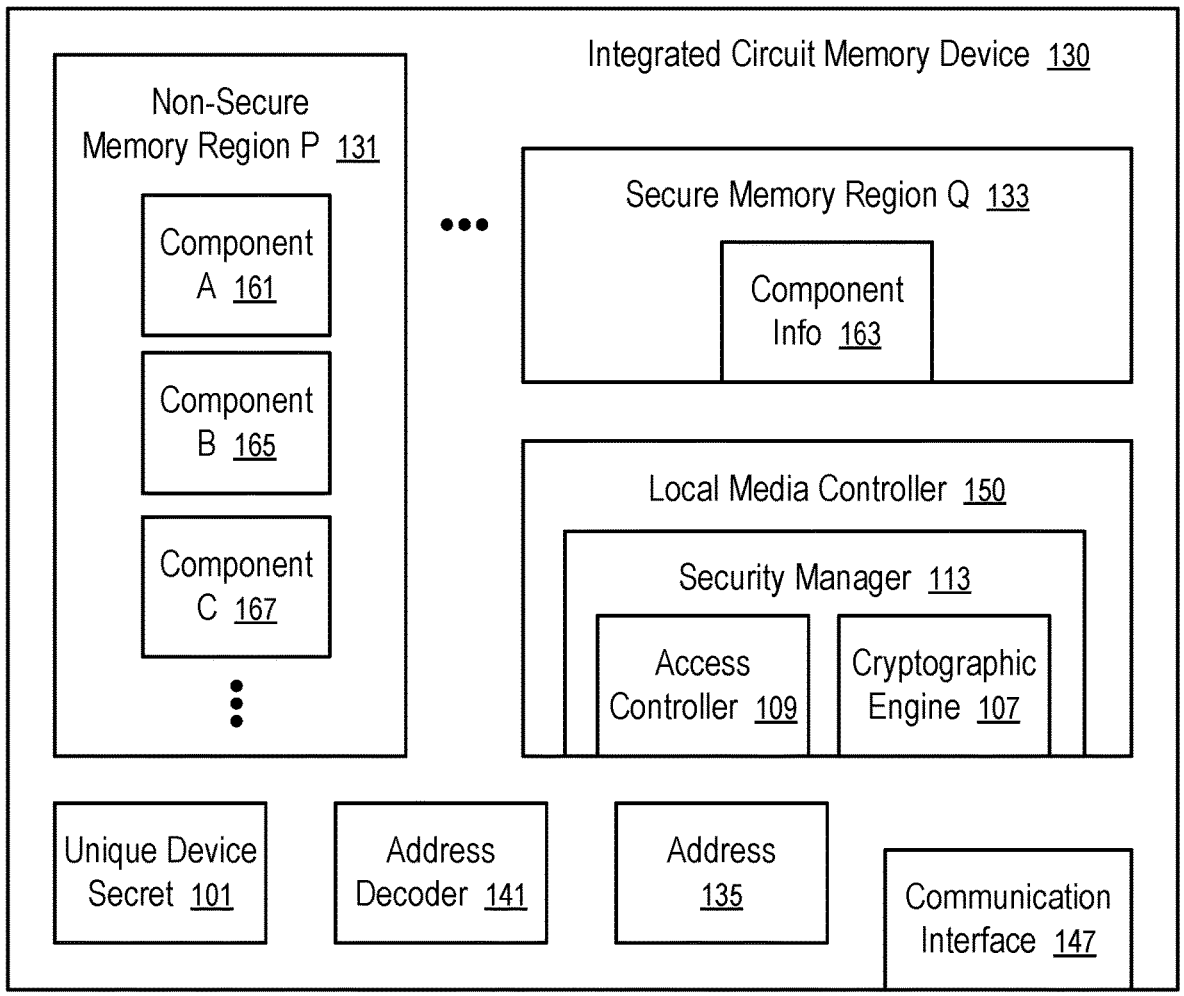
FIG. 1 illustrates an integrated circuit memory device according to one embodiment.

At least some aspects of the present disclosure are directed to secure booting of a computing device having multiple layers of components of trusted computing base.

A computing device, such as an Internet of Things (IoT) device, can be configured to have an unique identity, among a population of similar devices, based on cryptography and a unique secret stored in the computing device. For example, the identity can be established based on a combination of hardware and software/firmware of the computing device according to operations and requirements specified for Device Identifier Composition Engine (DICE). The unique identity of the computing device and its validation provide a basis of trust for the use, deployment and service of the computing device.

Software/firmware of the computing device can include multiple layers of components of trusted computing base (TCB), such as a bootloader, an operating system, and an application. During a boot process, the components can be loaded into the computing device for execution in a sequence that corresponds to the order of layers. The computing device having loaded up to a component at a particular layer (e.g., bootloader, operating system, or application) can have a compound device identifier (CDI) representative of the computing device running the components having been loaded, and a corresponding cryptographic key usable to demonstrate that the computing device has the compound device identifier (CDI). The compound device identifier (CDI) can be an identifier of the last component of the particular layer having been loaded into the computing device.

Each component can have a TCB component identity (TCI) that characterizes the component. For example, a TCB component identity (TCI) of a software/firmware component can be based on a cryptographic measurement of the component and other information, such as an identification of the manufacturer/vendor of the component, a version number, a build number, a serial number, a component name, etc. For example, the cryptographic measurement can be a value calculated by applying a cryptographic hash function to the data of the component (e.g., the instructions and resources of the component). Such a measurement or value can be referred to as a digest of the component.

Layers of components can be linked or chained for enhanced security for the trust base. For example, the compound device identifier (CDI) of a current layer component (e.g., layer i) can be generated, by a previous layer component (e.g., layer i−1) based on a secret of the previous layer component, and the TCB component identity (TCI) of the current component; and the compound device identifier (CDI) of the current layer component (e.g., layer i) can be used as the unique secret for the next layer component (e.g., layer i+1).

When a component is compromised (e.g., corrupted, tampered with), its compound device identifier (CDI) and thus cryptographic key will be different from when the component is not compromised and thus cannot pass validation. However, the detection of such a compromised component can be delayed to a late stage of identity validation after the use of its compound device identifier (CDI) and/or after the booting of the computing device and the loading of the components.

At least some aspects of the present disclosure address the above and other deficiencies and/or challenges by validating the TCB component identity (TCI) of a component and the integrity of the component before the use of the TCB component identity (TCI). For example, information about the component usable to validate its the TCB component identity (TCI) and its integrity can be stored in a secure memory region of a secure memory device. Access and/or modification to the secure memory region can be controlled via cryptography and a cryptographic key representative of the privilege to access and/or modify the secure memory region.

For example, the component information stored in the secure memory region can include a digest (cryptographic measurement or hash value) of an uncompromised, healthy version of the component, and the storage location(s) of parts of the component. The current digest of the component as stored in the storage location(s) can be computed and compared with the digest stored in the secure memory region for the uncompromised, healthy version of the component. When there is a mismatch between the digests, the component as stored in the storage location(s) can be determined to have been compromised; and in response, a repair or recovery operation can be performed, before the component is loaded in the boot process and/or before the TCB component identity (TCI) of the component is used in generating a compound device identifier (CDI) and a corresponding cryptographic key usable to demonstrate the possession of the compound device identifier (CDI).

A secure memory device can store an unique device secret representative of the memory device. A cryptographic key can be generated based at least in part on the unique device secret. A digital signature generated using the cryptographic key can be used to demonstrate the identity of the memory device represented at least in part by the unique device secret, as further discussed below in connection with FIG. 2.

The secure memory device can require a command to be signed using a cryptographic key before the command is executed to access a secure memory region. The cryptographic key is representative of the privilege to access the secure memory region. Thus, without the cryptographic key, an application or entity cannot access the secure memory region, as further discussed below in connection with FIG. 3.

FIG. 1 illustrates an integrated circuit memory device 130 according to one embodiment.

In FIG. 1, the memory device 130 has a secure memory region 133 storing a component 161 (e.g., a zeroth layer component) and component information 163. The component information 163 includes data about components (e.g., 165. 167) (e.g., a first layer component loaded by the zeroth layer component, a second layer component loaded by the first layer component) to be loaded for execution after the component 161.

The memory device 130 stores a unique device secret 101 that is unique to the memory device 130 among a population of similar memory devices.

During booting of a computing system having the memory device 130, a compound device identifier (CDI) of the component 161 is generated based on the unique device secret 101 and the TCB component identity (TCI) of the component 161; a compound device identifier (CDI) of the component 165 is generated, by the component 161, based on the compound device identifier (CDI) of the component 161 and the TCB component identity (TCI) of the component 165; and a compound device identifier (CDI) of the component 167 is generated, by the component 165, based on the compound device identifier (CDI) of the component 165 and the TCB component identity (TCI) of the component 167; etc.

The component information 163 can include at least the digest of the component 165 to be loaded by the component 161 and/or the digest of the component 167 to be loaded by the component 165. The component information 163 can further include the identification of storage locations of parts of the components (e.g., 165, 167, and/or the component 161). The storage locations can also be referred to as locations of measurement.

Thus, before the TCB component identity (TCI) of the component 165 is used to compute its compound device identifier (CDI) by the component 161, a security manager 113 of the memory device 130 (and/or a host system of the memory device 130 running the component 161) can compute the current digest of the component 165 as stored at the storage locations identified by the component information 163. The computed current digest can be compared to the digest in the component information 163 to determine the validity of the TCB component identity (TCI) of the component 165 and/or the integrity of the component 165. If the component 165 as stored is compromised or not healthy, the boot process can be suspended; and a repair and/or recovery operation can be performed. If the component 165 is healthy, its compound device identifier (CDI) can be computed by the component 161 from the TCB component identity (TCI) of the component 165 and the compound device identifier (CDI) of the component 161. Since the compound device identifier (CDI) of the component 161 is derived from the unique device secret 101, the possession of the compound device identifier (CDI) of the component 165 is evidence that the component 165 has access to the unique device secret 101.

Similarly, another component 167 (e.g., application) is to be loaded after and/or by the component 165 (e.g., operating system). A compound device identifier (CDI) of the component 167 is to be computed based on the compound device identifier (CDI) of the component 165, as a secret of the component 167, and the TCB component identity (TCI) of the component 167 to be loaded after the component 165. Since the compound device identifier (CDI) of the component 165 is indirectly derived from the unique device secret 101, the possession of the compound device identifier (CDI) of the component 167 is evidence that the component 165 has access to the unique device secret 101. The component information 163 can include the digest of the component 167 to be loaded after the component 165 and further include the identification of storage locations of parts of the component 167. Thus, before the TCB component identity (TCI) of the component 167 is used to compute a compound device identifier (CDI) of the component 167, the security manager 113 of the memory device 130 (and/or a host system of the memory device 130 running the component 161 and/or the component 165) can compute the current digest of the component 167 as stored at the storage locations (locations of measurement) identified by the component information 163. The computed current digest can be compared to the digest in the component information 163 to determine the validity of the TCB component identity (TCI) of the component 167 and/or the integrity of the component 167, in a way similar to the validation of the component 165.

In some implementations, there can be more layers of components than what is illustrated in FIG. 1. In other implementations, less layers of components than what is illustrated in FIG. 1 can be used in a computing device. Thus, the present disclosure is not limited to a particular number of layers of components that are linked or chained to generate their compound device identifiers.

FIG. 1 illustrates an example where the components 161, 165, ..., 167 are stored in a non-secure memory region 131. Commands configured to access to the non-secure memory region 131 do not require signatures or verification codes generated using cryptographic keys representing the privileges to have the commands executed within the memory device 130. In other implementations, some or all of the components 161, 165, ..., 167 can also be stored in the secure memory region 133 for enhanced security.

The integrated circuit memory device 130 can be enclosed in a single integrated circuit package. The integrated circuit memory device 130 includes multiple memory regions 131, ..., 133 that can be formed in one or more integrated circuit dies.

A memory region (e.g., 131 or 133) can be allocated for use by the host system as a partition or a namespace. Memory locations in the memory region (e.g., 131 or 133) can be specified by the host system via an address of Logical Block Addressing (LBA); and the memory device 130 can include an address map that specifies the relation between LBA addresses in a partition or namespace and physical addresses of corresponding memory cells used to provide the storage space allocated to the partition or namespace. In some implementations, the memory device 130 is configured in a memory sub-system (e.g., 110 illustrated in FIG. 8); and a memory sub-system controller 115 can be configured to perform the address mapping for the memory device 130.

A typical memory cell in a memory region (e.g., 131, . . . , 133) can be programmed to store one or more bits of data.

The memory device 130 has a local media controller 150, which can implement at least a portion of a security manager 113.

The security manager 113 of the memory device 130 can include an access controller 109 and a cryptographic engine 107.

The cryptographic engine 107 can be implemented via a logic circuit and/or instructions or microcode to perform cryptographic calculations, such as applying a cryptographic hash function to a data item to generate a hash value, encrypting a data item to generate cipher text using a cryptographic key, decrypting cipher text to recover a data item using a corresponding cryptographic key, generating a cryptographic key of symmetric cryptography and/or a pair of cryptographic keys of asymmetric cryptography, etc.

The access controller 109 controls access to at least one of the memory regions 131, . . . , 133 and/or other functions of the memory device 130 based on cryptographic keys that are representative of access privileges.

For example, the security manager 113 can control access to a secure memory region 133 based on a cryptographic key that is generated based on a secret 101 of the integrated circuit memory device 130 and/or a cryptographic key representative of an owner or an authorized user of the memory device 130. For example, when a request or command to write data into the secure memory region 133 is received in the integrated circuit memory device 130, the security manager 113 verifies whether the request is from a requester having the cryptographic key. If no, the security manager 113 may reject the write request. To demonstrate that the request is from an authorized requester, the requester can digitally sign the request, or a challenge message, using the cryptographic key. When the security memory device 130 determines that the digital signature is made using the correct cryptographic key, the requester is seen to have the permission to write the data into the secure memory region 133. For example, the memory device 130 can store a cryptographic key that is used to authenticate the digital signature of the signed request/command.

The memory device 130 can be configured to use different cryptographic keys to access control different commands. For example, one cryptographic key can be representative of the privilege to have a security command executed in the memory device 130; and the security command is used to specify that another cryptographic key is representative of the privilege to read and/or write in a secure memory region 133. For example, the memory device 130 can have multiple secure memory regions (e.g., 133); and access to each of the secure memory regions (e.g., 133) can be controlled via a separate cryptographic key.

For example, the memory device 130 can have a unique device secret 101 that represents an identity of the memory device 130; and a cryptographic key derived from the unique device secret 101 can be representative of an owner privilege to operate the memory device 130 and thus have security commands executed in the memory device.

In general, the secure memory region 133 can have different security requirements for different types of accesses (e.g., read, write, erase). For example, the secure memory region 133 can be configured to require digital signatures verifiable via the cryptographic key to write or change data in the secure memory region 133 but does not require a signed command to read the data from the secure memory region 133. Alternatively, the secure memory region 133 can be configured to require digital signatures verifiable via the cryptographic key to read, write, and/or change data in the secure memory region 133. Alternatively, the secure memory region 133 can be configured to require digital signatures verifiable via different cryptographic keys for different operations, such as read, write, change, erase, etc., in the secure memory region 133.

The integrated circuit memory device 130 has a communication interface 147 to receive a command having an address 135. In response to the address 135 identifying a secure memory region (e.g., 133) that is configured with access control, the security manager 113 uses the cryptographic engine 107 to perform cryptographic operations for the verification that the request is from a requester having the cryptographic key authorized for the access to the memory region 133, before providing memory data retrieved from the memory region 133 using an address decoder 141. The address decoder 141 of the integrated circuit memory device 130 converts the address 135 into control signals to select a group of memory cells in the integrated circuit memory device 130; and the local media controller 150 of the integrated circuit memory device 130 performs operations to determine the memory data stored in the memory cells at the address 135.

Figure 2:
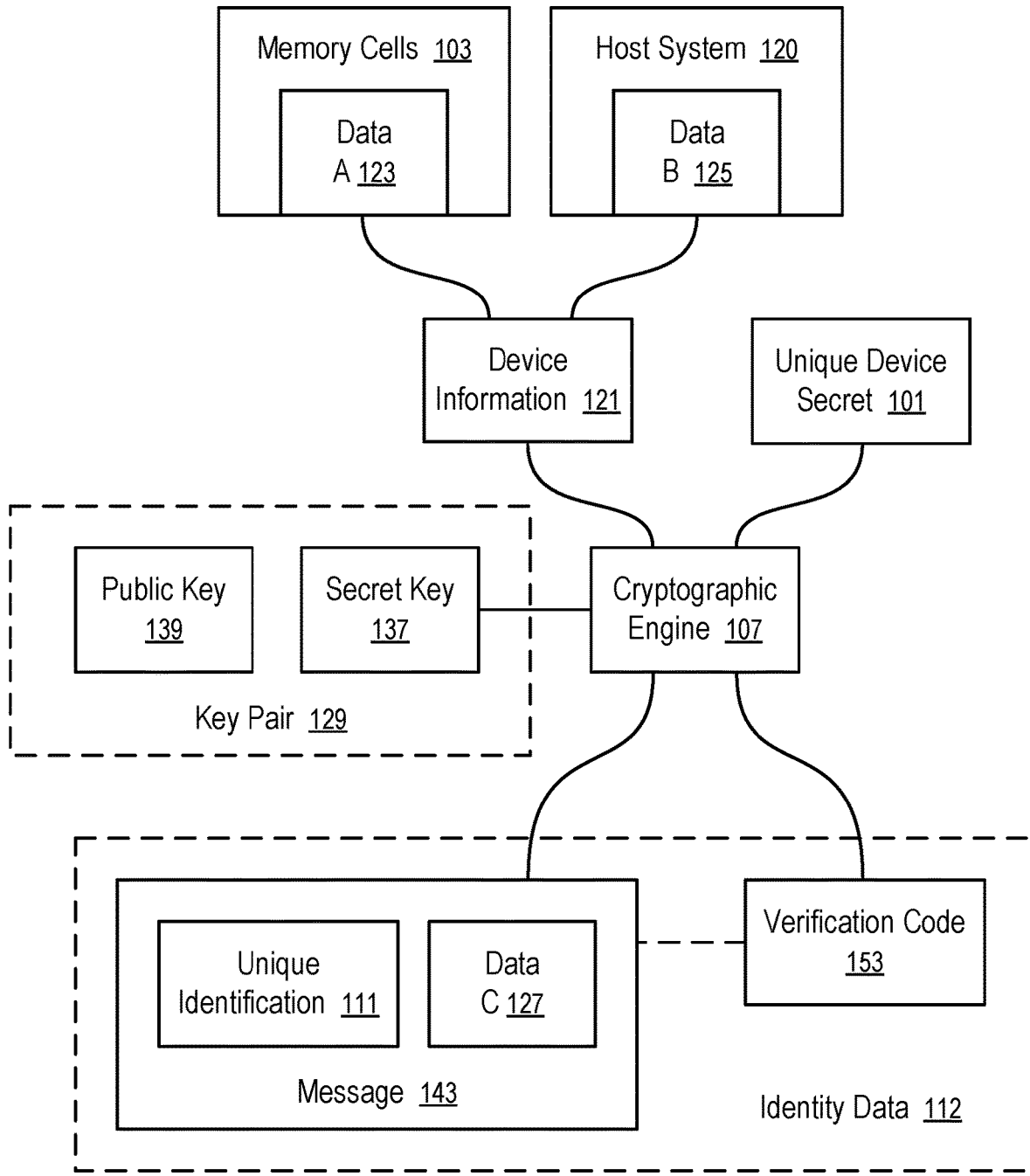
FIG. 2 illustrates the generation of identity data in an integrated circuit memory device according to one embodiment.

FIG. 2 illustrates the generation of identity data in an integrated circuit memory device according to one embodiment. For example, the technique of FIG. 2 can be implemented in the memory device 130 of FIG. 1.

In FIG. 2, the cryptographic engine 107 of a memory device 130 (e.g., as in FIG. 1) is used to generate at least a secret key 137 using its unique device secret 101 and device information 121.

For example, when asymmetric cryptography is used, the secret key 137 is a private key of a cryptographic key pair 129. An associated public key 139 is generated together with the private key using the cryptographic engine 107.

Alternatively, when symmetric cryptography is used, the secret key 137 can be generated and used without a public key 139 and without the key pair 129.

In some implementations, multiple key pairs 129 are generated and used. For example, when a method of Device Identity Composition Engine (DICE) and Robust Internet-of-Things (RIoT) is used, a first pair of asymmetric keys is referred to as device identification keys; and a second pair of asymmetric keys is referred to as alias keys. The private device identification key can be used to certify the authenticity of the alias keys and then immediately deleted and purged from the memory device 130 and to safeguard its secrecy, especially when the generation or use of the private device identification key occurs at least in part in the host system 120. The alias keys can be used in authentication in further transactions and/or communications. For example, the private device identification key can be generated at a boot time and used to sign certificates, such as a certificate of the alias public key, and then deleted. After the identity of the memory device 130 and the authenticity of the public alias key are validated or confirmed using the certificates signed using the private device identification key as the secret key 137, the private alias key can then be used as the secret key 137 of the memory device 130 in subsequent operations, until the host system 120 reboots.

For example, the data 123 stored in the memory cells 103 for the device information 121 can include a set of instructions (e.g., software, firmware, operating system, application) to be executed by the processing device 118 of the host system 120 to which the communication interface 147 of the memory device 130 is connected.

For example, the data 123 can include a cryptographic hash value of the set of instructions. For example, a known hash value of the set of instructions can be stored in the memory cells 103; and the current hash value of the set of instructions can be computed for comparison with the known hash value. If the two hash values agree with each other, the integrity of the set of instructions is verified; and the hash value of the integrity of the set of instructions can be used as part of the device information 121 to compute the secret key 137.

Alternatively, the current hash value of the set of instructions stored in the memory cells 103 can be used directly in the calculation of the secret key 137. If the instructions have changed (e.g., due to data corruption and/or tampering or hacking), the validation of the secret key 137 by a security server will fail.

Optionally, the data 123 can include an identification of the set of instructions, such as a hash value of the source code of the instructions, a name of the software/firmware package represented by the instructions, a version number and/or a release date of the package, etc.

Optionally, the data 123 can include trace data stored into the memory cells 103 during the process of building and/or customizing the computing system having the host system 120 and the memory device 130. For example, when the memory device 130 is assembled into a component device (e.g., a memory sub-system), a piece of trace data representative of the manufacturer of the component device, the model of the component device, and/or the serial number of the component device is stored into the memory cells 103 as part of the device information 121. Subsequently, when the component device is assembled into the computing system, a piece of trace data is added into the memory cells as part of the device information 121. Further trace data can be added to the memory cells 103 as part of the device information 121 to reflect the history of the memory device 130 for the individualization of the identity of the memory device 130.

Optionally, the device information 121 can further include data 125 received from the host system 120 to which the communication interface 147 of the memory device 130 is connected.

For example, the computing system can have at least the host system 120 and the memory device 130. Some of the components in the host system 120 may be removed or replaced. At the time of booting up the host system 120, a portion of the instructions stored the memory cell 103 is executed to collect data 125 about the components that are present in the host system 120 at the boot time. Thus, the device information 121 can represent a particular configuration of software/data and hardware combination of the memory device 130 and/or the host system 120. The secret key 137 generated based on the device information 121 and the unique device secret 101 represent the identity of the memory device 130 with the particular configuration.

To demonstrate the identity of the memory device 130 and/or the host system 120, the cryptographic engine 107 generates a verification code 153 from a message 143 and the secret key 137.

The verification code 153 of the secret key 137 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation.

In general, verifying whether a sender of a message (e.g., 143) has a cryptographic key (e.g., 145) involves the validation of a verification code (e.g., 153) of the message (e.g., 143). The verification code can be in the form of a hash digest, a digital signature, a Hash-based Message Authentication Code (HMAC), a Cipher-based Message Authentication Code (CMAC), etc. The verification code is generated using the cryptographic key and the message as an input to cryptographic operations such as hashing, encrypting, and/or other computations such that it is generally impractical to generate the verification code without the cryptographic key and to generate the verification code from modified version of the message. Thus, when the recipient confirms that the received verification code is valid for the received message and a cryptographic key, the recipient can conclude that the sender has the corresponding cryptographic key and the received message is the same as the message used to generate the received cryptographic key.

In some implementations, the recipient performs the validation of a verification code of a message using the same cryptographic key as used by the sender to generate the verification code. For example, the recipient uses the same cryptographic key to generate the verification code of the received message and compare the generated verification code with the received verification code. If there is a match, the received verification code is valid for the received message; and the sender can be considered to have the cryptographic key. Otherwise, the received verification code is invalid for the received message; either the received message has been changed since the generation of the verification code, or the received verification code was generated using a different cryptographic key, or both.

In some implementations, the recipient performs the validation of a verification code of a message using a public cryptographic key in a key pair; and the sender generates the verification code using a private cryptographic key in the key pair. For example, the verification code can be generated by applying a hash function to the message to generate a hash value of the message. The cipher text of the hash value obtained through encrypting the hash value performed using an encryption key can be used as the verification code. A recipient of the message and the verification code performs validation using a corresponding decryption key, which is the same as the encryption key when symmetric cryptography is used and is a different key in a key pair when asymmetric cryptography is used. After recovering a hash value from the cipher text using the decryption key, the recovered hash value can be compared to the hash value of the received message; if there is a match, the received verification code is valid for the received message; otherwise, the received verification code is invalid for the received message. Alternative, the recipient can use the encryption key to perform the validation without performing decryption. The recipient can generate the verification code of the message using the encryption key for comparison with the received verification code.

In some implementations, a message and a cryptographic key is combined to generate a hash value as the verification code, as in a technique of Hash-based Message Authentication Code (HMAC). For example, a cryptographic key can be used to generate two keys. After combining one of the two keys with the message to generate a message modified by the key, a cryptographic hash function can be applied to the key-modified message to generate a hash value, which is further combined with the other key to generate a further message. After applying the cryptographic hash function (or another cryptographic hash function) to the further message, a hash-based message authentication code is generated. A recipient of the message can use the same cryptographic key to generate the hash-based message authentication code of the received message for comparison with the received hash-based message authentication code. If there is a match, the validation is successful; otherwise, the validation fails.

In general, any techniques for generating and validating a verification code for a message from a sender and a cryptographic key used by the sender to generate the verification code can be used to determine whether the sender has the cryptographic key. The recipient is to use an appropriate cryptographic key to perform the validation, which can be the same as the cryptographic key used to generate the verification code, or in the same pair of asymmetric cryptographic key. Thus, the present disclosure is not limited to a particular technique of hash digest, digital signature, and/or hash-bashed message authentication code.

For convenience, a verification code (e.g., 153) generated for a message (e.g., 143) using a cryptographic key (e.g., 145) to represent both the message (e.g., 143) and the cryptographic key (e.g., 145) can be referred to, generally, as a digital signature of the message (e.g., 143) signed using the cryptographic key (e.g., 145), with the understanding that the verification code can be generated using various techniques, such as hash-based message authentication code.

Optionally, the message 143 can include a user identification, such as a name, an email address, a registered username, or another identifier of an owner or authorized user of the host system 120 in which the identity data 112 is generated.

Optionally, part of the message 143 can provide information in an encrypted form. For example, the information can be encrypted using a public key of the security server such that the information is not accessible to a third party.

The message 143 can be a certificate presenting the unique identification 111 of the memory device 130 and/or the host system 120. The message 143 can further present other data 127, such as a counter value maintained in the memory device 130, a cryptographic nonce, and/or other information related to the validation of the identity data 112. The memory device 130 can monotonically increase the counter value to invalidate identity data that have lower counter values to prevent replay attacks.

In some implementations, the data 127 can include part of the device information 121 used to generate the secret key 137.

In some implementations, the secret key 137 is a private alias key in a pair of asymmetric keys. The data 127 includes a certificate presenting the corresponding public alias key in the pair of asymmetric keys. The certificate presenting the public alias key is signed using a device identification key of the memory device 130. The public alias key can be used to validate the verification code 153 for the message 143 and the private alias key that is used as the secret key 137. Once the security server validates the certificate presenting the public alias key, signed using the device identification key of the memory device 130 and provided as part of the data 127, the security server can use the public alias key to validate the verification code 153 signed using the private alias key as the secret key 137. In such an implementation, the security server can use the public alias key provided in the message 143 to validate the verification code 153 without having to regenerate the pair of alias keys; and the memory device 130 can generate the alias key pair 129 using data not known to the security server.

The certificate presenting the public alias key can be generated and validated in a way as in FIG. 2, where the secret key 137 is the device identification key generated using the device information 121 and the unique device secret 101. Optionally, the memory device 130 initially provides the security server with the certificate having the public alias key. Subsequently, the memory device 130 can use the private alias key as the secret key 137 without including the public alias key in the message 143, or without including the certificate of the public alias key in the message 143.

Further, the verification of the identity of the memory device 130 can include the use of multiple secret keys and verification codes signed using the secret keys. For example, a device identification secret key can be used to initially establish the authenticity of an alias secret key and the identity of the memory device 130; and subsequently, the alias secret key can be used to validate the authenticity of the identity of the memory device 130. In general, the device identification secret key and the alias secret key can be based on asymmetric cryptography or symmetric cryptography, since the security server can generate the corresponding cryptographic keys generated by the memory device 130.

For improved security, the memory device 130 does not use the processing power outside of the memory device 130 to generate its copy of the secret key 137 and does not communicate the secret key 137 outside of the memory device 130. The generation and use of the secret key 137 are performed using the logic circuit of the cryptographic engine 107 sealed within the memory device 130.

Alternatively, part of operations to generate and use the secret key 137 can be implemented via a set of instructions stored in the memory cells 103 and loaded into the processing device 118 of the host system 120 for execution. For improved security, the secret key 137 is not communicated across the communication interface 147 in clear text; and the instructions can be configured to purge the secret key 137 from the host system 120 after the generation and/or after the use.

The identity data 112 can be generated in response to the memory device 130 being powered up, in response to a request received in the communication interface 147, and/or in response to the host system 120 boots up (e.g., by executing a boot-loader stored in the memory cells 103). The data 127 can include a count value maintained in the memory device 130. The count value increases when the operation to generate the identity data 112 is performed. Thus, a version of the identity data 112 having a count value invalidates prior versions of the identity data 112 having count values lower than the count value.

In some implementations, the data 123 includes multiple layers of components (e.g., component A 161, component B 165, component C 167); and the device information 121 include the component information 163 and the compound device identifiers of at least some of the components.

Figure 3:
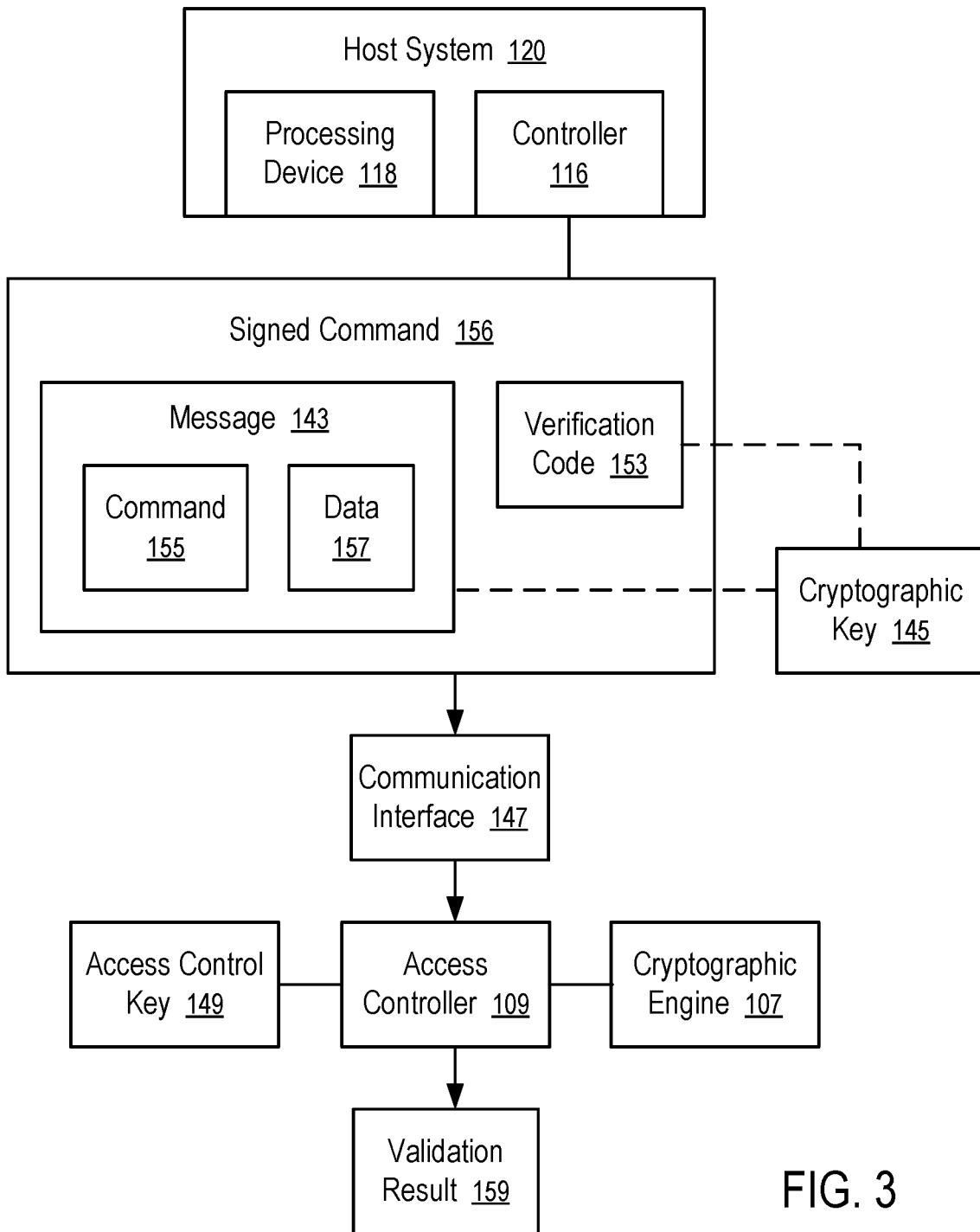
FIG. 3 illustrates a technique to control execution of a command in a memory device according to one embodiment.

FIG. 3 illustrates a technique to control execution of a command in a memory device according to one embodiment. For example, the technique of FIG. 3 can be implemented in the memory device 130 of FIG. 1.

In FIG. 3, the access controller 109 is configured with an access control key 149 to determine whether a signed command 156 received in the communication interface 147 is from an entity having the privilege to have the command 155 executed in the secure memory device 130.

When a controller 116 of a host system 120 sends a command 155 to the communication interface 147 of the memory device 130, the access controller 109 determines whether the sender of the command 155 has the privilege to request the memory device 130 to execute the command 155. The host system 120 can include one or more processing devices 118 that execute instructions implementing an operating system and/or application programs.

A cryptographic key 145 is configured to represent the privilege that is to be checked using the access control key 149. A sender of the command 155 can generate a verification code 153 from the cryptographic key 145 and a message 143 containing the command 155.

Similar to the verification code 153 discussed above in connection with FIG. 2, the verification code 153 of the cryptographic key 145 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation; and the verification code 153 can be referred to, generally, as a digital signature of the message 143 signed using the cryptographic key 145, with the understanding that the verification code 153 can be generated using various techniques, such as hash-based message authentication code.

In FIG. 3, the access controller 109 uses a corresponding access control key 149 to validate the verification code 153 submitted to the communication interface 147 for the command 155. The access controller 109 uses the cryptographic engine 107 to generate a validation result 159 of the received message 143 and the received verification code 153. Based on the validation result 159, the access controller 109 can selectively allow the command 155 to be executed within the memory device 130 or block the execution of the command 155.

For example, the access control key 149 can be one of the cryptographic keys stored in the memory device 130. Different access control keys can be used to control different privileges for executing different commands and/or for executing a command operating on different sections or regions of memory cells.

For example, one cryptographic key 145 can be representative of the privilege to have a security command executed in the memory device 130. When the security command is executed, an access control key 149 is installed (or uninstalled) in the memory device 130 for the validation of a verification code of another cryptographic key representative of the privilege to have a read command (or a write command) executed to access the secure memory region 133.

Optionally, the cryptographic key 145 is generated in the process of validating the identity of the memory device 130 based on the unique device secret 101 of the memory device 130; and a secret known between the memory device 130 and an owner of the memory device 130 allows the generation of a session key as the cryptographic key 145 to represent the privileges to have selected commands executed in the memory device 130 during a communication session. The communication session can have a time limit and/or be terminated via a command to the memory device 130.

In some implementations, a same session key used as the cryptographic key 145 representative of a privilege (e.g., to read or write the data in the secure memory region 133) and as the access control key 149 for the validation of verification codes (e.g., 153) generated using the cryptographic key 145.

In another implementations, a pair of cryptographic keys of asymmetric cryptography can be used for the session. The public key in the pair is used as the access control key 149; and the private key in the pair can be used as the cryptographic key 145 representative of the corresponding privilege.

After the installation in the memory device 130 the access control key 149 for the validation of the verification codes (e.g., 153) generated using the cryptographic key 145 representative of the privilege to read or write in the secure memory region 133, the cryptographic key 145 can be used by an authorized entity to generate the signed command 156. The signed command 156 can be transmitted to the communication interface 147 of the memory device 130 by the host system 120. After the access controller 109 validates the verification code 153 in the signed command 156, the access controller 109 allows the memory device 130 to execute the command 155.

The message 143 can include data 157 that represents restrictions on the request to execute the command 155.

For example, the data 157 can include an execution count value maintained within the memory device 130 such that verification codes generated for lower counts are invalidated.

For example, the data 157 can include a cryptographic nonce established for a specific instance of a request to execute the command 155 such that the verification code 153 cannot be reused for another instance.

For example, the data 157 can include a time window in which the verification code 153 is valid.

For example, the data 157 can include the identification of a memory region in which the command 155 is allowed to be executed.

For example, the data 157 can include a type of operations that is allowed for the execution of the command 155 in the memory device 130.

Figure 4:
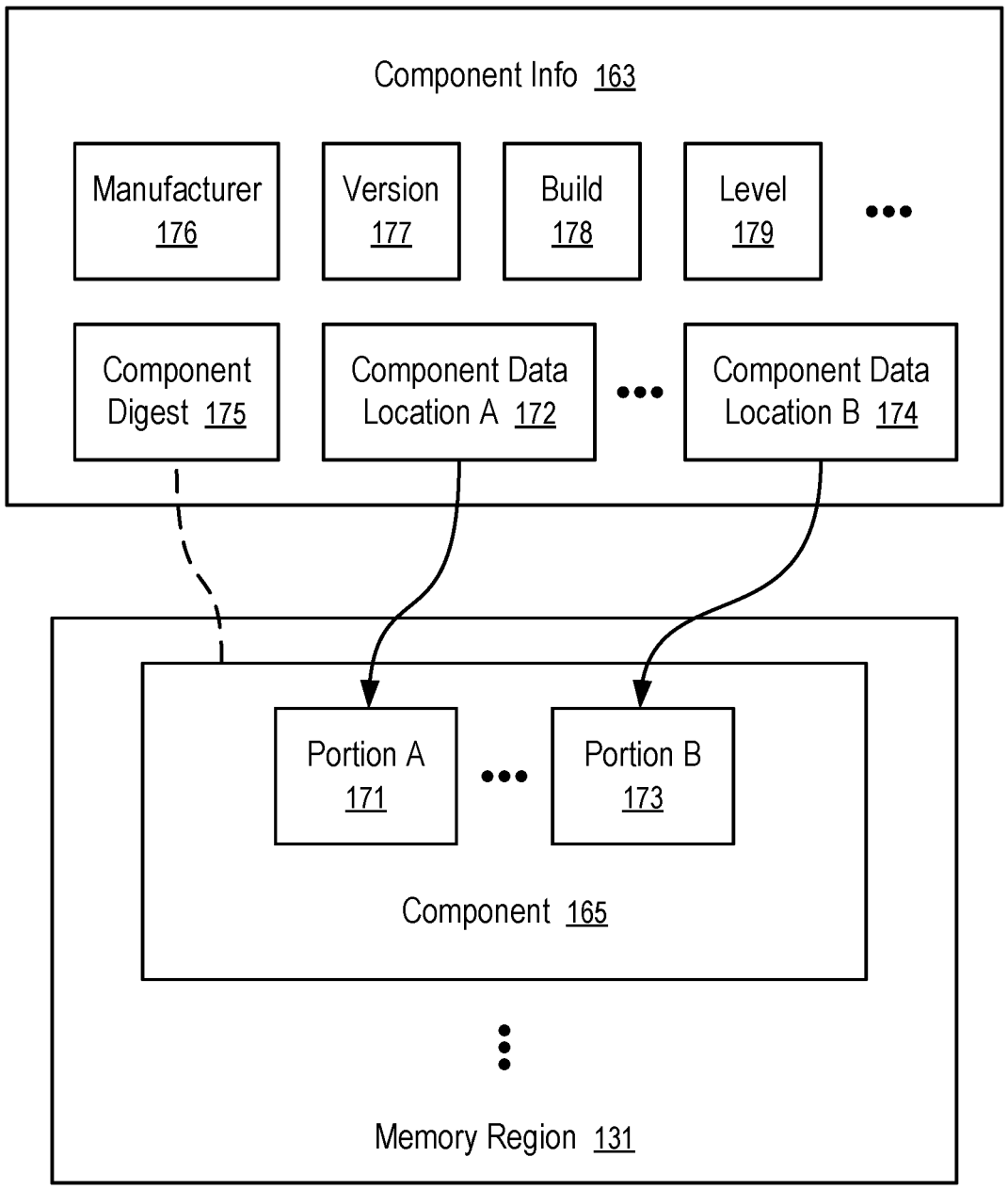
FIG. 4 illustrates component information to facility secure identity chaining between components of trusted computing base according to one embodiment.

FIG. 4 illustrates component information 163 to facilitate secure identity chaining between components of trusted computing base according to one embodiment. For example, the technique of FIG. 4 can be implemented in the memory device 130 of FIG. 1 with security features of FIG. 2 and FIG. 3.

In FIG. 4, the component information 163 specified for the validation of the component 165 includes the component data locations 172, ..., 174, and a component digest 175.

For example, the locations 172, ..., 174 can be identified via physical addresses of memory cells 103 in the memory region 131, or local address of memory cells 103 in the memory region 131.

When the component 165 is loaded after the execution of an operating system, the locations 172, ..., 174 can be identified via files and/or directories in a file system controlled by the operating system. Further, the memory region 131 can be in another memory device separate from the memory device 130 in which the component information 163 is stored. The portions 171, ..., 173 can be accessed via the file system serviced by the operating system.

For example, the component information 163 can be stored in a secure memory region 133 to prevent from being tampered with. The component 165 can be stored in another memory region 131 (e.g., a secure region, or a non-secure region). Each of the locations 172, ..., 174 identifies a respective portion (e.g., 171, ..., 173) of the component 165. Thus, the locations 172, ..., 174 allows the security manager 113 to read and compute a current digest 175 for comparison with component digest 175 specified in the component information 163 for the component 165. The comparison can be performed before the component 165 is used, and/or before a TCB component identity (TCI) of the component 165 is used (e.g., in the generation of the compound device identifier (CDI) of the component 165).

The security manager 113 can use the component information 163 to compute a validated TCB component identity (TCI) of the component 165. For example, after determining that the current digest of the component 165 as stored at locations 172, . . . , 174 agrees with the component digest 175, the security manager 113 can compute the TCB component identity (TCI) of the component 165 from the digest 175 and other information about the component 165, such as identifications of a manufacturer 176 of the component, a version 177 of the component, a build 178 of the component, a level 179 of the component in the layered structure of the software/firmware, etc. Additional information, such as a hash value of the source code of the component 165 can also be used in the generation of the TCB component identity (TCI) of the component 165. In some implementations, the component digest 175 is computed from combination of the portions 171, . . . , 173 and the other information about the component 165, such as the identifications of a manufacturer 176 of the component, a version 177 of the component, a build 178 of the component, a level 179 of the component in the layered structure of the software/firmware, etc.

Thus, when the component 165 as stored in the memory region 131 is compromised, the booting process can be interrupted (e.g., for an alert, repair, and/or recovery); and the use of a TCB component identity (TCI) of the component 165 can be prevented before the component 165 is repaired and/or recovered. The technique can prevent the execution and/or use of a compromised component 165.

Figure 5:
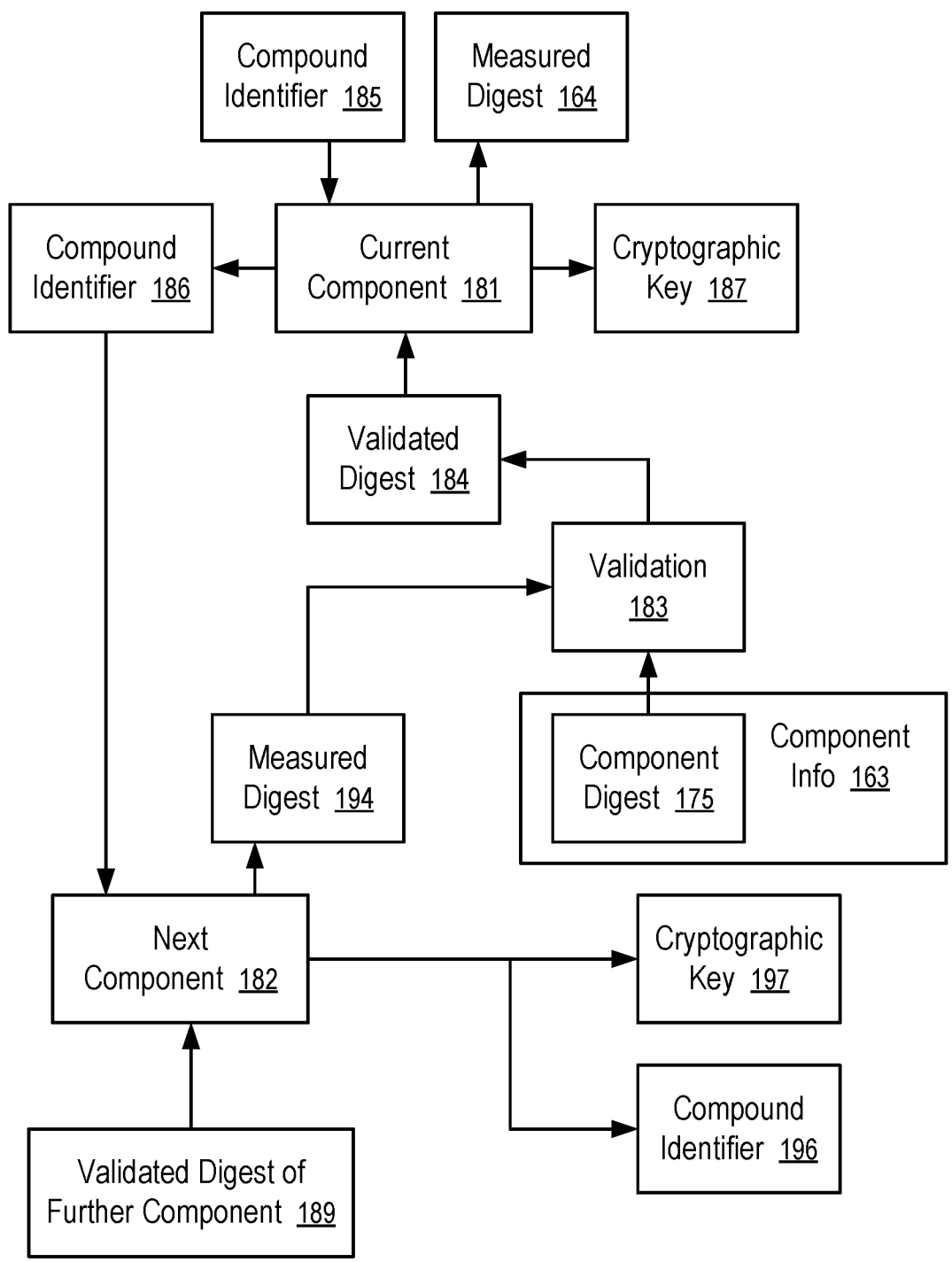
FIG. 5 shows secure identity chaining between components of trusted computing base according to one embodiment.

FIG. 5 shows secure identity chaining between components of trusted computing base according to one embodiment. For example, the technique of FIG. 5 can be used in a computing device having the memory device of FIG. 1, the security features of FIG. 2 and FIG. 3, and the component information 163 stored in a secure memory region of the memory device 130.

In FIG. 5, components of a computing device are loaded for execution sequentially. Before a current component 181 is loaded, the measured digest 164 of the current component 181 is compared to a stored digest of a corresponding healthy version of the component 181 to determine the integrity of the current component 181.

After determining, based on the measured digest 164, that the current component 181 is healthy, a compound identifier 185 is computed for the current component 181; and the current component 181 can be loaded for execution. During execution of the current component 181, the security manager 113 can use the compound identifier 185 and a validated digest 184 of the next component 182 to generate a compound identifier 186 of the next component 181.

Since the compound identifier 186 is generated using the compound identifier 185, the possession of the compound identifier 186 is indicative of the next component 181 having the secret associated with the compound identifier 185.

In one example, when the current component 181 is the component to be loaded first for execution, the compound identifier 185 can be computed using the unique device secret 101 of the memory device 130 (or another identifier derived from the unique device secret 101). Thus, a verification that the component 181 has the correct compound identifier 185 is an indication that the component 181 is loaded from the memory device 130 having the unique device secret 101.

In another example, when the current component 181 is a subsequent component loaded for execution after one or more other components having been loaded for execution, the identifier 185 can be based on the compound identifier of the component loaded just before the current component 181. Having the correct compound identifier 185 is indicative of the current component 181 being loaded after the previous component having a correct compound identifier. Through the chaining of the compound identifiers, the current component 181 is seen to be loaded from the memory device 130 having the unique device secret 101 of the memory device 130.

The compound identifier 185 can be considered a secret in the memory device 130 and/or the computing device. To demonstrate that the current component 181 has the compound identifier 185, a cryptographic key 187 is generated from the compound identifier 185. The cryptographic key 187 can be used to sign a challenge message to demonstrate that the current component 181 has the correct cryptographic key 187, in a way the secret key 137 is used to sign the message 143 and generate the verification code 153 in FIG. 2 for identity verification.

For example, when symmetric cryptography is used, the cryptographic key 187 is a secret key. Alternatively, when asymmetric cryptography is used, the cryptographic key 187 is a private key in a pair of asymmetric cryptographic keys; and a public key in the key pair can be reveal for a third party to validate signatures created using the private key. A certificate can be used to present the public key of the current component 181. To prevent tempering and/or forgery of the certificate presenting the public key of the current component 181, the certificate can be signed using a private key that has a trusted public key, such as the private key of the component loaded before the current component, or signed by a trusted authority or security server.

In some implementations, the compound identifier 186 is computed as a result and/or during the initial execution of the current component 181. In other implementations, the security manager 113 within the memory device 130 computes the compound identifier 186 and prevents the compound identifier 186 from being revealed through the communication interface 147 to outside of the memory device 130.

In FIG. 5, prior to the generation of the compound identifier 186 of the next component 182 and the loading of the next component 182 for execution, the measured digest 194 of the next component 182 is calculated (e.g., based on the locations 172, . . . , 174 identified in the component information 163). The measured digest 194 is compared to the component digest 175 recorded in the component information 163 for the validation 183 of the health of the next component 182. If the measured digest 194 and the component digest 175 are the same, the validated digest 184 of the next component 182 can be used in the computation of the compound identifier 186 of the current component 181. For example, the validated digest 184 can be used in forming a TCB component identity (TCI) of the next component 182. In some implementations, the TCB component identity (TCI) of the next component 182 is based on a combination of the validated digest 184 and further information about the next component 182 specified in the component information 163. In other implementations, the validated digest 184 is based on a combination of portions 171, . . . , 173 of the component 165 and the further information about the next component 182 (e.g., manufacturer 176, version 177, build 178, level 179).

If the next component 182 as stored in the memory region 131 is healthy, the compound identifier 186 of the next component 182 can be computed from the validated digest 184 of the next component 182 and the compound identifier 185 of the current component 181. The corresponding cryptographic key 197 of the next component 182 can be computed in a way similar to the computation of the corresponding cryptographic key 187 of the current component 181.

In an example, if there is a further component to be loaded after the next component 182, the compound identifier 196 of the further component is to be computed from the validated digest 189 of the further component and the compound identifier 186, just like the compound identifier 186 of the current component 181 being computed from the validated digest 184 of the next component 182 and the compound identifier 185.

Figure 6:
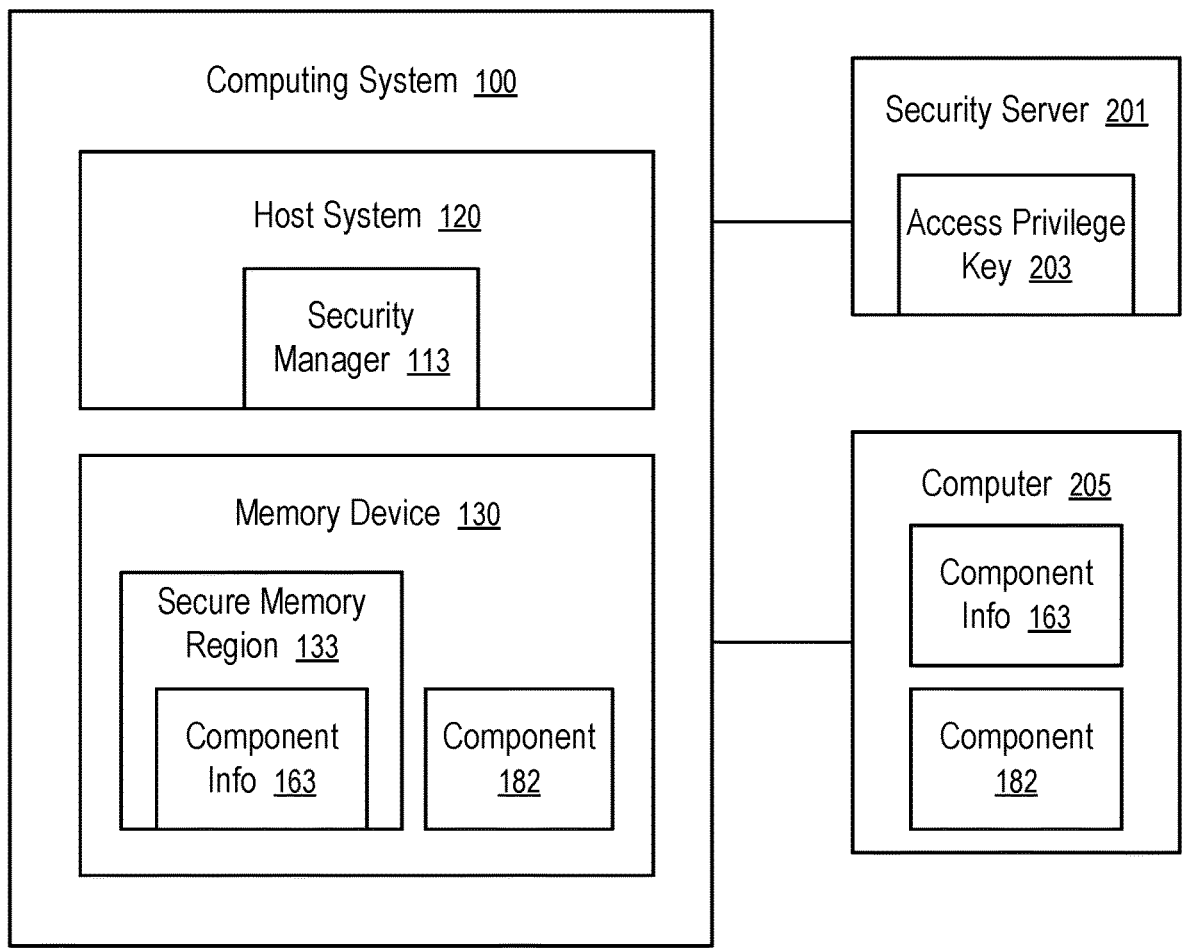
FIG. 6 illustrates a security server to facilitate installation of component information according to one embodiment.

FIG. 6 illustrates a security server 201 to facilitate installation of component information according to one embodiment. For example, the security server 201 can be used to install the component information 163 of FIG. 4 in the memory device 130 of FIG. 1 to facilitate secure identity chaining as discussed above in connection with FIG. 5.

In FIG. 6, the security server 201 has an access privilege key 203 that can be used to sign commands to write and/or modify data in the secure memory region 133. A security manager 113 running in the host system 120 can provide a communication connection between the memory device 130 and the security server 201. When the computer 205 (e.g., of a manufacturer of the computing system 100) installs a component 182 into the memory device 130, the computer 205 can request the security manager 113 to write into the secure memory region 133 the component information 163 about the component 182 as stored in the memory device 130. After validating the identity of the computer 205, the security manager 113 can present the command 155 with its data 157 for signing by the security server 201 using the access privilege key 203. After the security server 201 generates the verification code 153 (e.g., using the access privilege key 203 as the cryptographic key 145 illustrated in FIG. 3), the security manager 113 can communicate the signed command 156 to the communication interface 147 of the memory device 130. After the access controller 109 validates the verification code 153 using a corresponding access control key 149, the command 155 can be executed to write the component information 163 in the secure memory region 133.

When the validation 184 determines that the component 182 is compromised, the security manager 113 can connect to the computer 205 to retrieve a fresh copy of the component 182 for the repair or recovery of the component 182. Alternatively, a backup copy of the component 182 is stored in the security server 201 (e.g., during the initial installation of the component 182 into the memory device 130); and the recovery or repair can be performed via the security server 201 using the backup copy.

Figure 7:
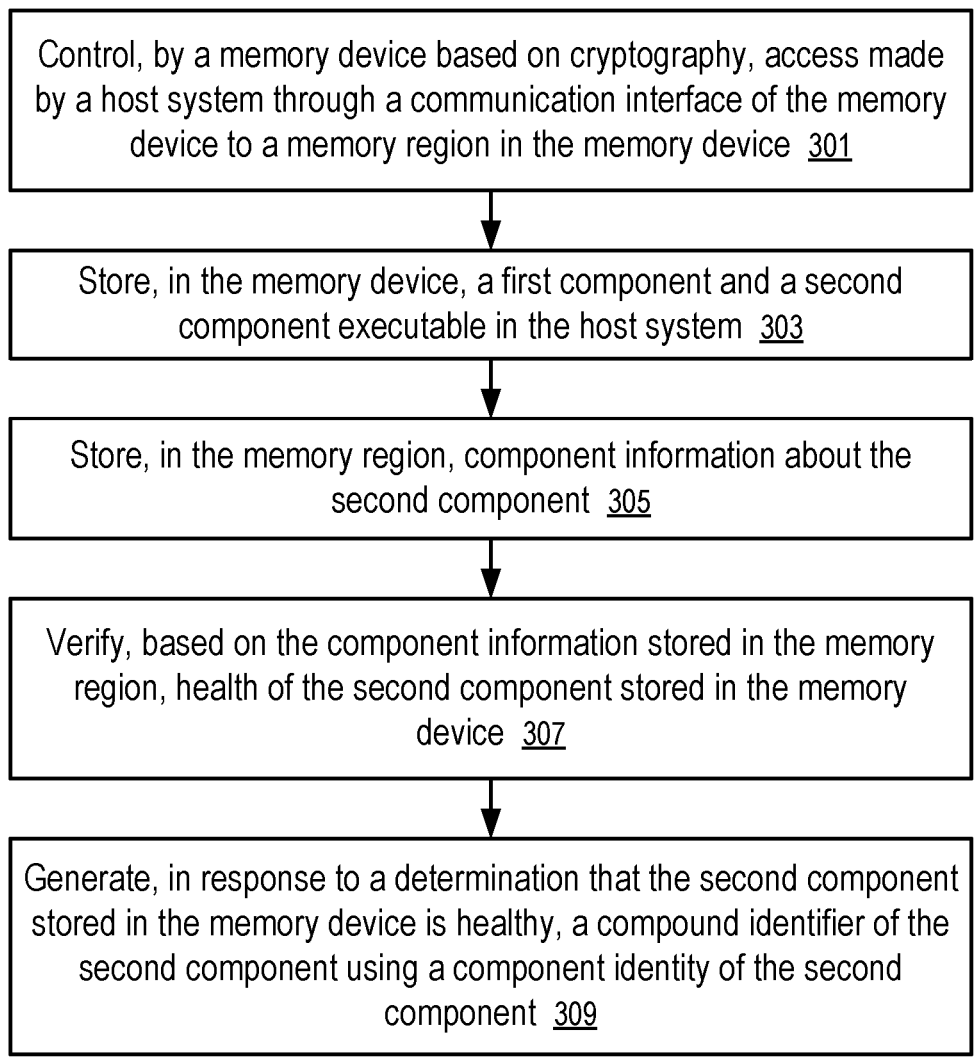
FIG. 7 shows a method to boot a computing device according to one embodiment.

FIG. 7 shows a method to boot a computing device according to one embodiment. The method of FIG. 7 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 7 can be implemented in a system of FIG. 6 and performed at least in part by the processing device 118 or controller 116 of the host system 120 in FIG. 3, the controller 115 and/or the controller 150 of a memory sub-system 110 of FIG. 8, or processing logic in the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a memory device 130 controls, based on cryptography, access made by a host system 120 through a communication interface 147 of the memory device 130 to a memory region 133 in the memory device 130.

At block 303, the memory device 130 stores, a first component 181 and a second component 182 executable in the host system 120.

At block 305, the memory device 130 stores, in the memory region 133, component information 163 about the second component 182.

For example, the component information 163 can include a first digest 175 and identifies a storage location (e.g., 172 or 174) of at least a portion (e.g., 171 or 173) of the second component 182 in the memory device 130.

For example, the first component 181 can be a component 161 (e.g., bootloader); the second component 182 can be an operating system loaded by the component 161 (e.g., bootloader); and the storage location (e.g., 172 or 174) can be identified using a physical memory address in the memory device 130.

For example, the first component 181 can be an operating system; the second component 182 can be an application running under the operating system; and the storage location (e.g., 172 or 174) can be identified via a file system controlled by the operating system.

At block 307, a security manager 113 verifies, based on the component information 163 stored in the memory region 133, health of the second component 182 stored in the memory device 130.

For example, the security manager 113 can verify the health of the second component 182 by: retrieving content (e.g., portion 171 or portion 173) from the storage location (e.g., 172 or 174); computing a second digest 194 based at least in part on the content; and comparing the first digest 175 and the second digest 194 to verify the health of the second component 182.

At block 309, the security manager 113 generates, in response to a determination that the second component 182 stored in the memory device 130 is healthy, a compound identifier 186 of the second component 181 using a component identity of the second component 182.

For example, the component identity of the second component 182 can be based at least in part on the second digest 194. The component information 163 can further include identifications of: a manufacturer 176 of the second component 182; a version 177 of the second component 182; a build 178 of the second component 182; or a level 179 of the second component 182; or any combination thereof. The component identity of the second component 182 can be further based on such identifications.

For example, after a determination that the second component 182 is healthy, the security manager 113 can compute the component identity of the second component 182 from the component information 163, including the identifications of a manufacturer 176 of the second component 182, a version 177 of the second component 182, a build 178 of the second component 182, and/or a level 179 of the second component 182, etc.

For example, the security manager 113 can compute the compound identifier 186 of the second component 182 from the component identity of the second component 182 and a secret of the first component 181. The secret of the first component 181 can be a compound identifier 185 of the first component 181 that is derived from the unique device secret 101 of the memory device.

For example, the compound identifier 185 of the first component 181 can be generated based on a compound identifier of a zeroth different component stored in the memory device 130 and configured to be executed before the first component (e.g., in an example where the zeroth different component is executed before the first component 181, which is executed before the second component 182); execution of the first component 181 depends on execution of the zeroth different component; execution of the second component 182 depends on execution of the first component 181. After the security manager 113 computes a cryptographic key 187 from the compound identifier 185 of the first component 181, the cryptographic key 187 can be used (e.g., as the secret key 137) to generate a verification code 153 for a message 143 to demonstrate that the first component 181, the memory device 130 and/or the computing system 100 having the memory device 130 have/has the compound identifier 186.

Figure 8:
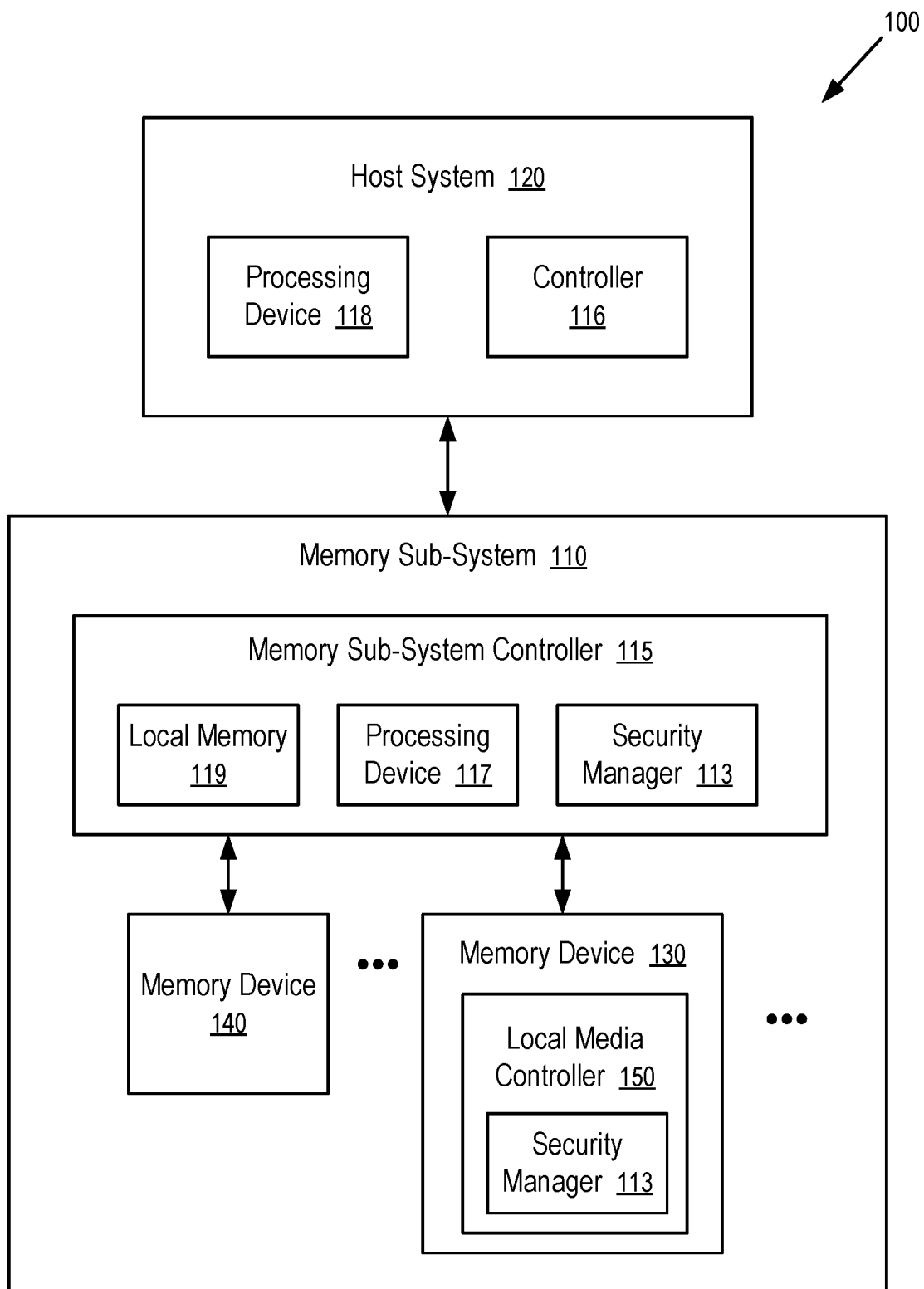
FIG. 8 illustrates an example computing system having a memory sub-system in accordance with some embodiments of the present disclosure.

FIG. 8 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 8 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 8 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 8 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 discussed above. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip disposed in the memory sub-system 110. In other embodiments, the security manager 113 can be part of firmware of the memory sub-system 110, an operating system of the host system 120, a device driver, or an application, or any combination therein.

Figure 9:
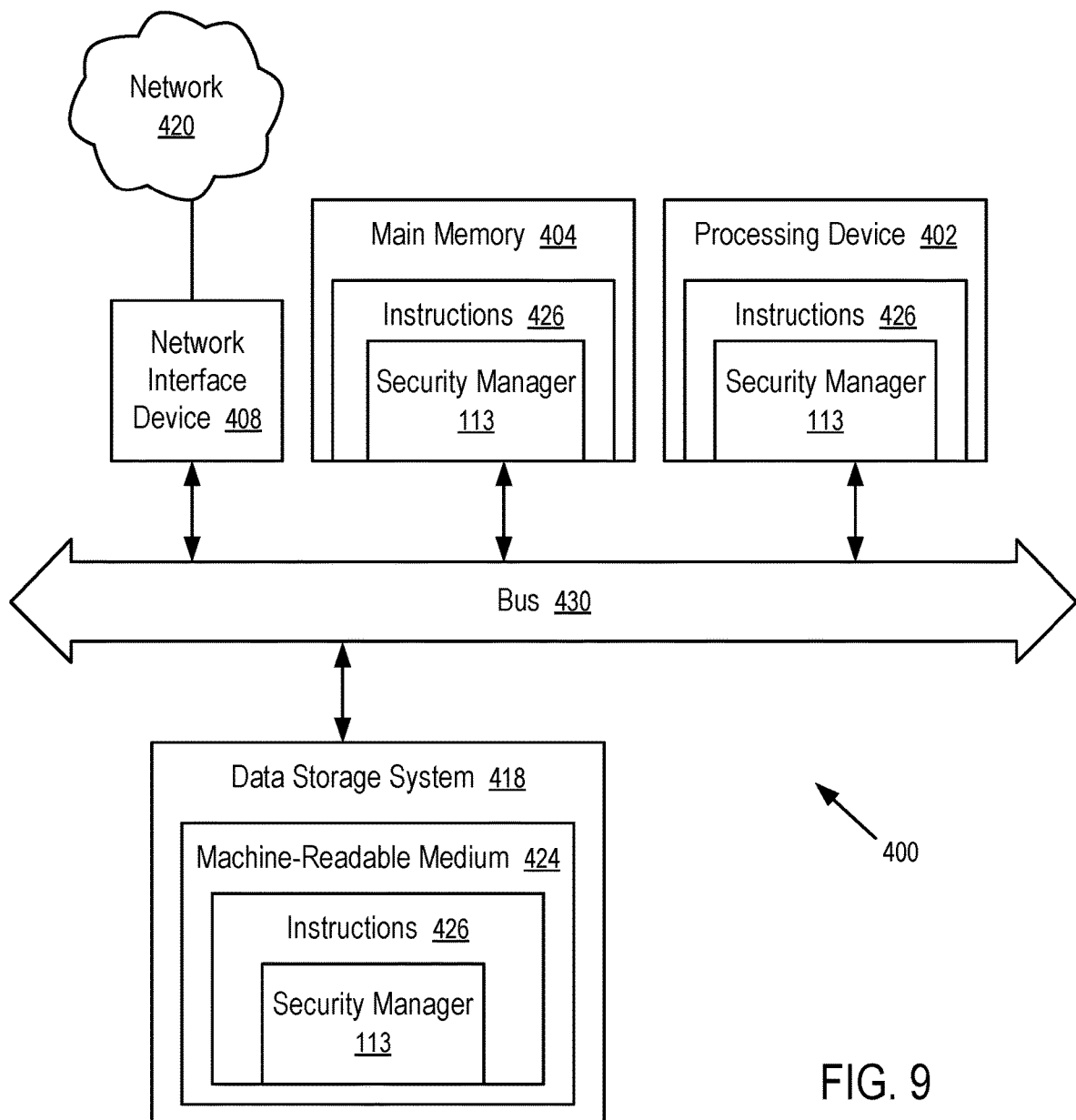
FIG. 9 is a block diagram of an example computer system in which embodiments of the present disclosure can operate.

FIG. 9 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 8) that includes, is coupled to, or utilizes a memory sub-system (e.g., the memory sub-system 110 of FIG. 8) or can be used to perform the operations of a security manager 113 (e.g., to execute instructions to perform operations corresponding to the security manager 113 described with reference to FIGS. 1-8). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 8.

In one embodiment, the instructions 426 include instructions to implement functionality corresponding to a security manager 113 (e.g., the security manager 113 described with reference to FIGS. 1-8). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device, comprising:
   a communication interface configured to be connected to a host system;
   memory cells having a memory region, wherein the memory cells are configured to store a first component and a second component;
   a secure memory region, the secure memory region configured to store component information about the second component, the secure memory region accessible via a signed command; and
   a logic circuit configured to control, based on cryptography, access made through the communication interface to the memory region by:
      reading the component information from the secure memory region by issuing a signed command to the secure memory region;
      computing a second digest based on the second component stored in the memory region;
      verifying health of the second component stored in the memory cells by comparing the second digest to a first digest included in the component information,
      generating a compound device identifier of the second component using a component identity of the second component if verifying the health of the second component succeeds, and
      repairing the second component if verifying the health of the second component fails by replacing the second component with a new component using a second signed command.

2. The memory device of claim 1, wherein the first digest identifies a storage location of at least a portion of the second component in the memory cells; and the logic circuit is configured to retrieve content from the storage location to compute the second digest and compare the first digest and the second digest to verify the health of the second component.

3. The memory device of claim 2, wherein the component identity of the second component is based at least in part on the second digest.

4. The memory device of claim 3, wherein the component information includes, and the component identity of the second component based on, identifications of:
   a manufacturer of the second component;
   a version of the second component;
   a build of the second component;
   a level of the second component; or
   any combination thereof.

5. The memory device of claim 4, wherein the first component is a bootloader; the second component is an operating system; and the storage location is identified using a physical memory address.

6. The memory device of claim 4, wherein the first component is an operating system; the second component is an application; and the storage location is identified via a file system controlled by the operating system.

7. The memory device of claim 4, wherein the logic circuit is configured to compute the component identity of the second component from the component information after a determination that the second component is healthy, and compute the compound device identifier of the second component from the component identity of the second component and a secret of the first component.

8. The memory device of claim 7, further comprising: a unique device secret, wherein the secret of the first component is a compound device identifier of the first component based on the unique device secret.

9. The memory device of claim 8, wherein the compound device identifier of the first component is generated based on a compound device identifier of a zeroth component stored in the memory cells and configured to be executed before the first component; execution of the first component depends on execution of the zeroth component; and execution of the second component depends on execution of the first component.

10. The memory device of claim 9, wherein the logic circuit is further configured to compute a cryptographic key from the compound device identifier of the first component and generate a verification code for a message using the cryptographic key to demonstrate possession of the compound device identifier of the first component.

11. A method, comprising:
controlling, by a memory device based on cryptography, access made by a host system through a communication interface of the memory device to the memory device;
storing, in the memory device, a first component and a second component executable in the host system in a first region of the memory device;
storing, in the memory region, component information about the second component in a second region of the memory device, the second memory region accessible via a signed command;
reading the component information from the secure memory region by issuing a signed command to the second memory region;
computing a second digest based on the second component stored in the memory region;
verifying health of the second component by comparing the second digest information to a first digest included in the component information;
generating a compound device identifier of the second component using a component identity of the second component if verifying the health of the second component succeeds; and
repairing the second component if verifying the health of the second component fails by replacing the second component with a new component using a second signed command.

12. The method of claim 11, wherein the first digest identifies a storage location of at least a portion of the second component in the memory device; and the method further comprises:
retrieving content from the storage location;
computing the second digest based at least in part on the content; and
comparing the first digest and the second digest to verify the health of the second component.

13. The method of claim 12, wherein the component identity of the second component is based at least in part on the second digest; and the component information includes, and the component identity of the second component based on, identifications of:
a manufacturer of the second component;
a version of the second component;
a build of the second component;
a level of the second component; or
any combination thereof.

14. The method of claim 13, wherein the first component is a bootloader; the second component is an operating system; and the storage location is identified using a physical memory address.

15. The method of claim 13, wherein the first component is an operating system; the second component is an application; and the storage location is identified via a file system controlled by the operating system.

16. The method of claim 13, further comprising:
computing the component identity of the second component from the component information after a determination that the second component is healthy; and
computing the compound device identifier of the second component from the component identity of the second component and a compound device identifier of the first component, wherein the compound device identifier of the first component is generated based on a unique device secret of the memory device.

17. The method of claim 16, wherein the compound device identifier of the first component is generated based on a compound device identifier of a zeroth component stored in the memory device and configured to be executed before the first component;
execution of the first component depends on execution of the zeroth component;
execution of the second component depends on execution of the first component; and the method further comprises:
computing a cryptographic key from the compound device identifier of the first component; and
generating a verification code for a message using the cryptographic key to demonstrate possession of the compound device identifier.

18. A computing apparatus, comprising:
a host system; and
a memory device, having:
a communication interface connected to the host system,
memory cells having a memory region, wherein the memory cells are configured to store a first component and a second component, and
a secure memory region, the secure memory region configured to store component information about the second component, the secure memory region accessible via a signed command; and
a logic circuit configured to control, based on cryptography, access made through the communication interface to the memory region;
wherein during booting of the computing apparatus, the computing apparatus is configured to:
read the component information from the secure memory region by issuing a signed command to the secure memory region,
compute a second digest based on the second component stored in the memory region,
verify health of the second component stored in the memory cells by comparing the second digest to a first digest included in the component information,
generate a compound device identifier of the second component using a component identity of the second component if verifying the health of the second component, and
repair the second component if verifying the health of the second component fails by replacing the second component with a new component using a second signed command.

19. The computing apparatus of claim 18, wherein the first digest identifies a storage location of at least a portion of the second component; and the computing apparatus is further configured to, during execution of the first component in the host system:
retrieve content from the storage location;
compute the second digest based at least in part on the content; and
compare the first digest and the second digest to verify the health of the second component.

20. The computing apparatus of claim 19, wherein the component identity of the second component is based at least in part on the second digest; and the component information includes, and the component identity of the second component based on, identifications of:
a manufacturer of the second component;
a version of the second component;
a build of the second component;
a level of the second component; or
any combination thereof.

* * * * *